United States Patent [19]

Ishikawa et al.

[11] Patent Number: 5,160,447
[45] Date of Patent: Nov. 3, 1992

[54] COMPRESSED POWDER MAGNETIC CORE AND METHOD FOR FABRICATING SAME

[75] Inventors: Masayuki Ishikawa; Tadashi Taguchi; Yasuhiko Tsuchihashi, all of Komagane, Japan

[73] Assignee: Kabushiki Kaisha Sankyo Seiki Seisakusho, Nagano, Japan

[21] Appl. No.: 313,612

[22] Filed: Feb. 21, 1989

[30] Foreign Application Priority Data

| Feb. 29, 1988 | [JP] | Japan | 63-46041 |
| Mar. 3, 1988 | [JP] | Japan | 63-50503 |
| Mar. 4, 1988 | [JP] | Japan | 63-51161 |
| Mar. 9, 1988 | [JP] | Japan | 63-55296 |

[51] Int. Cl.$^5$ .................. C04B 35/04; H01F 1/00; H01F 1/26
[52] U.S. Cl. .................. 252/62.54; 264/DIG. 54
[58] Field of Search ............. 252/62.54; 264/DIG. 58

[56] References Cited

U.S. PATENT DOCUMENTS

| 4,320,080 | 3/1982 | Esper et al. | 252/62.54 |
| 4,502,982 | 3/1985 | Horie et al. | 252/62.54 |
| 4,543,208 | 9/1985 | Horie et al. | 252/62.54 |
| 4,696,725 | 9/1987 | Ochiai et al. | 252/62.54 |
| 4,808,326 | 2/1989 | Tanino et al. | 252/62.54 |
| 4,879,055 | 11/1989 | Sezaki et al. | 252/62.54 |

FOREIGN PATENT DOCUMENTS 8606541 11/1986 World Int. Prop. O. .

Primary Examiner—Jerry Johnson
Attorney, Agent, or Firm—Wallenstein, Wagner & Hattis, Ltd.

[57] ABSTRACT

A compressed powder magnetic corer is disclosed in which the mixing ratio (vol %) of the parts occupied by binder resin, ferromagnetic powder and void formed therebetween is set for a specified value so as to obtain desired magnetic characteristics.

7 Claims, 11 Drawing Sheets

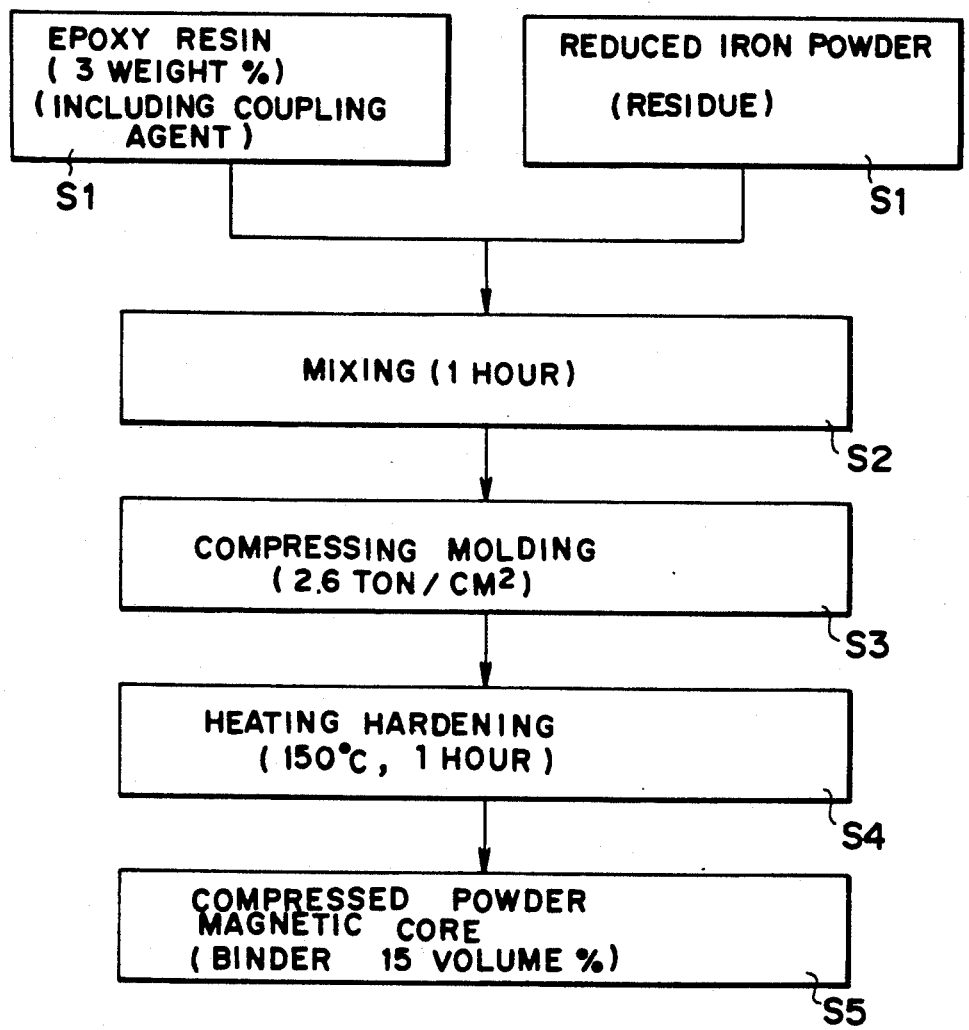
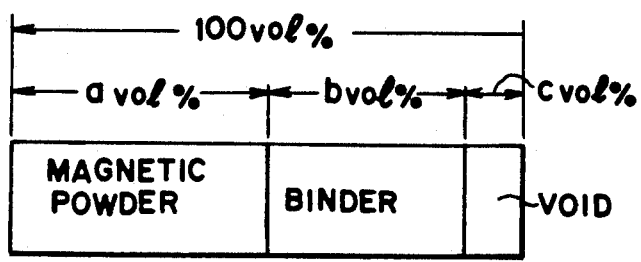

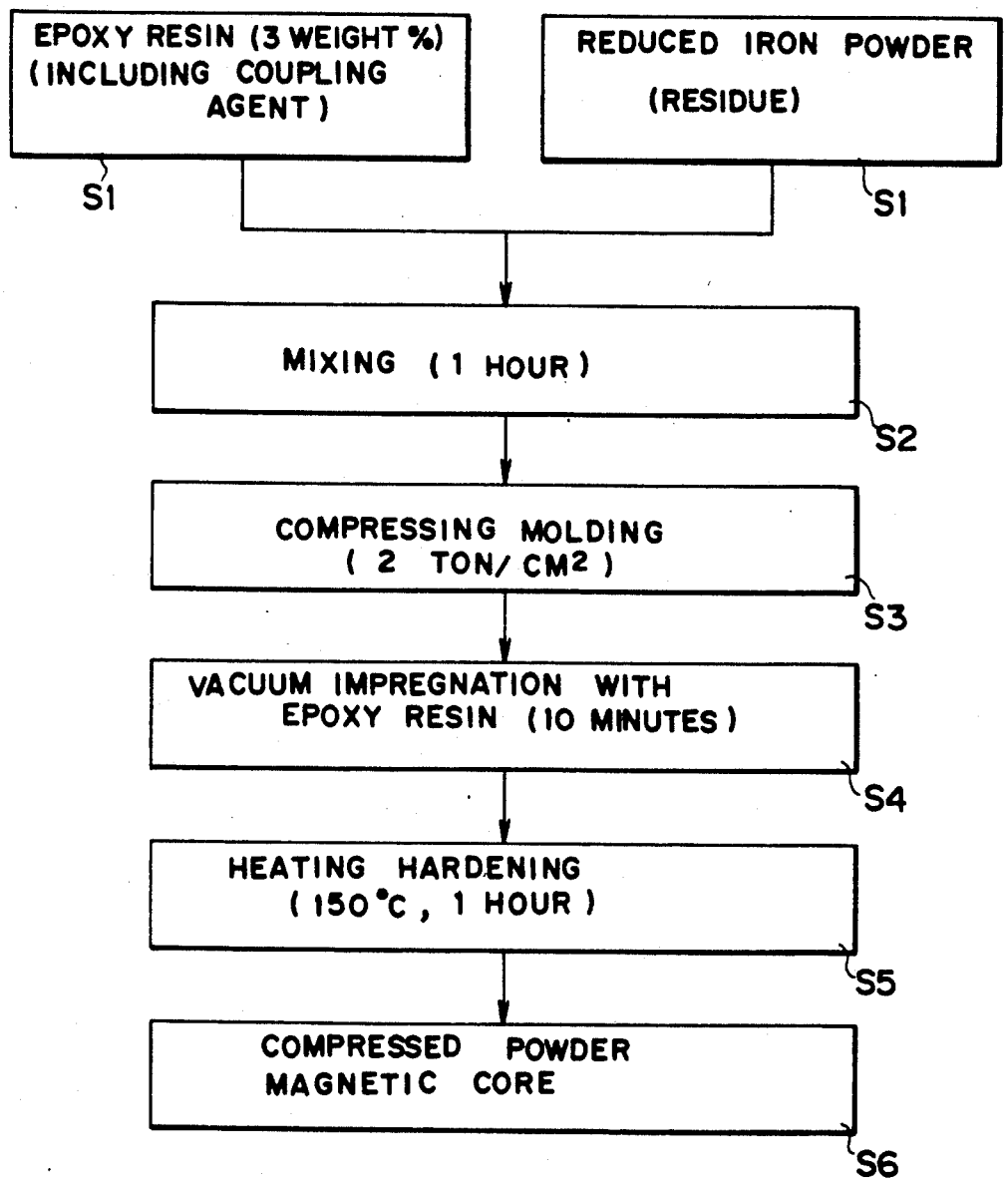
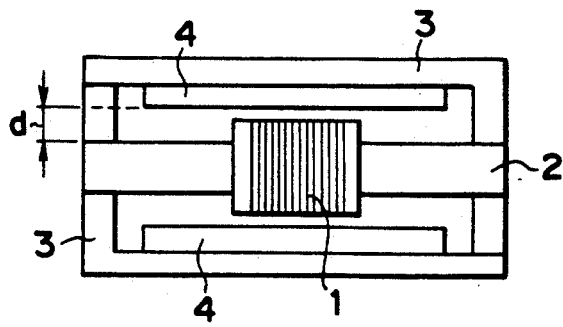

COMPRESSED POWDER MAGNETIC CORE AND METHOD FOR FABRICATING SAME

FIELD OF THE INVENTION

This invention relates to a compressed powder magnetic core and in particular to a compressed powder magnetic core satisfying magnetic characteristics, such as the cut-off frequency and the magnetic gap magnetic flux density required for use as an inner yoke used in a voice coil type linear motor, and a method for fabricating same.

Further this invention provides a compressed powder magnetic core having improved compact strength or easiness in compact formation or rust inhibiting power.

BACKGROUND OF THE INVENTION

Heretofore compressed powder magnetic cores, which are formed in predetermined shapes by binding ferromagnetic powder such as iron, iron alloy, or ferrite with binder resin such as epoxy resin, etc., are well known (e.g. JP-B-47-22514, JP-B-50-14207, JP-A-49-4197, etc.).

Compressed powder magnetic cores of this kind are usually either formed by compressing molding filling a die, after having mixed ferromagnetic powder such as iron, iron alloy, ferrite, etc. with binder resin such as epoxy resin, or formed by compressing molding, filling a die, after having coated ferromagnetic powder with binder resin such as epoxy resin, etc. A fabrication method was used, by which this compact thus formed by compressing molding is taken out from the die and subjected to heating hardening in a thermostatic oven to fabricate a compressed power magnetic core.

In contrast to the prior art described above, a first problem, which this invention is going to solve, is as follows.

In this kind of compressed powder magnetic cores their magnetic characteristics depend on the density of the ferromagnetic powder in the compact and the mixing ratio of the ferromagnetic powder and the binder resin has important influences on the magnetic characteristics. For this reason, according to the prior art techniques, for a compressed powder magnetic core formed by mixing ferromagnetic powder and binder resin and by compressing molding, the content ratio (mixing ratio) of the composition was defined by the volume % or the weight % of the binder resin and the ferromagnetic powder, occupying the compact.

However, in the binder resin within the compressed powder magnetic core after the molding usually void is formed, after solvent, etc. contained in the binder resin have been vaporized. The density of the whole compact is varied, depending on the void ratio in the whole compact, which varies the density of the ferromagnetic powder in the compact. For this reason, magnetic characteristics of the compressed powder magnetic core differ from those originally expected which gives rise to a problem. However for the compressed powder magnetic core according to the prior art techniques, since no attention is paid to the void ratio and the mixing ratio is defined only by the content ratio in the compact made of the binder resin and the ferromagnetic powder, even if the quantity of the binder resin and that of the ferromagnetic powder are constant, the void ratio varies, depending on differences in the pressure, etc. at the molding, and it may have significant influences on the magnetic characteristics of the compressed powder magnetic core which gives rise to a problem.

For example, in the case where the weight % of the binder resin is 30 vol % (volume %) and the compressed powder magnetic core is molded, varying the compacting pressure, the void ratio varies, depending on the compacting pressure, as indicated in Table 1. As the result, the density of the ferromagnetic powder in the compact varies and therefore the magnetic characteristics thereof vary.

Consequently in compressed powder magnetic cores fabricated as by the prior art techniques, paying attention only to the mixing ratio of the binder resin and the ferromagnetic powder, fluctuations in the magnetic characteristics take place, depending on differences in the void ratio, even for compressed powder magnetic cores formed with a same mixing ratio which gives rise to a drawback that the reliability as a product is low.

TABLE 1

| SAMPLE | BINDER | COMPACTING PRESSURE | VOID RATIO | SATURATION MAGNETIC FLUX DENSITY |
|---|---|---|---|---|
| A | 30 (vol %) | high | low | high |
| B | 30 (vol %) | low | high | low |

A second problem which this invention is going to solve, is as follows.

By the prior art method for fabricating the compressed powder magnetic core described previously, there were drawbacks that air bubbles, which have entered it at mixing and at filling a die, voids after solvent in the binder resin has been vaporized, etc. are apt to remain as they are and that told portions remain relatively abundantly within the fabricated compressed powder magnetic core.

For this reason compressed powder magnetic cores fabricated by the prior art method had a drawback that the robustness thereof is low because of the presence of void therein and therefore they are easily destroyed. Further they had a problem that the filling ratio in the compact with ferromagnetic powder (density of the ferromagnetic powder in the compact) and the saturation magnetic flux density are low because of the presence of the void and therefore the magnetic characteristics are apt to be unsatisfactory.

A third problem, which this invention is going to solve, is as follows.

In a prior art compressed powder magnetic core ferromagnetic powder having a relatively small grain size was used as ferromagnetic powder, which is in charge of the magnetic characteristics, in order to prevent eddy current loss and to try to improve the property of the compressed powder.

However there was a problem that, in the case where ferromagnetic powder having a small grain size is used, the fluidity of the compound of the ferromagnetic powder and the binder resin is reduced and difficulties such as bad pouring into a die, mixing of bubbles, etc. are apt to take place, which gives rise bad filling of the die.

For this reason, a compressed powder magnetic core according to the prior art techniques had a problem that in the case where it is formed by using ferromagnetic powder having a small grain size, a large void portion is apt to be formed in the compact after the compressing molding, which reduces the density of the compact and lowers the mechanical strength and the magnetic characteristics of the compressed powder magnetic core.

A fourth problem, which this invention is going to solve, is as follows.

The prior art compressed powder magnetic core had a drawback that since iron and iron alloys are used as the magnetic material, red rust is apt to be produced in an environment of high temperature and high humidity.

In particular, at the surface of the compressed powder magnetic core the resin coating layer is apt to peel due to wear at the compressing molding, scratch after the molding, etc. and the surface of the magnetic powder made of iron or iron alloy is often exposed, which accelerates the production of red rust.

Further, in a compressed powder magnetic core, void is apt to remain within the compact after the compressing molding. For this reason, there was a problem that water penetrates in the void, which may cause the production of red rust.

OBJECT OF THE INVENTION

A first object of this invention corresponding to the first problem described above is to provide always stably a compressed magnetic core having magnetic characteristics, which conform to the aimed object as an inner yoke used in a voice coil type linear motor, by clarifying the magnetic characteristics, i.e. the cut-off frequency and the magnetic gap magnetic flux density of the compressed powder magnetic core for the inner yoke used in the voice coil type linear motor by defining the occupation ratio of the ferromagnetic powder, the binder resin and the void in the compact of the compressed powder magnetic core.

A second object of this invention corresponding to the second problem described above is to provide a method for fabricating an improved compressed powder magnetic core capable of reducing the void ratio in the compressed powder magnetic core after the molding and improving the robustness and the magnetic characteristics of the magnetic core.

A third object of this invention corresponding to the third problem described above is to provide an improved a compressed magnetic core having a high density of the compact, owing to the fact that the void ratio in the compact is suppressed, even in the case where it is formed by using ferromagnetic powder having small grain sized as well as a high robustness and improved magnetic characteristics.

A fourth object of this invention corresponding to the fourth problem described above is to prevent the production of rust by increasing the rust inhibiting power of the compressed powder magnetic core composed of magnetic powder made of iron or iron alloy.

SUMMARY OF THE INVENTION

In order to achieve the first object described above, a compressed powder magnetic core according to this invention, which is formed by binding ferromagnetic powder by means of binder resin, is characterized in that it is so formed that the sum of the binder resin volume ratio (vol %) occupied by the binder resin stated above and the void volume ratio (vol %) occupied by the void formed within the binder resin in a compact is greater than 7 vol % and smaller than 50 vol %.

Further it is characterized in that the compressed powder magnetic core is subject to impregnation with resin so that the void formed in the binder resin in the compact is filled therewith.

According to this invention it is possible to clarify the ratio (density) of the part occupied by the ferromagnetic powder in the whole volume (ferromagnetic powder + binder resin + void) and to obtain magnetic characteristics, which conform to the aimed object by defining the mixing ratio so that the sum of the binder resin volume ratio (vol %) occupied by the binder resin stated above and the void volume ratio (vol %) occupied by the void formed in the binder resin is greater than 7 vol % and smaller than 50 vol %.

In order to achieve the second object described above, a method for fabricating a compressed powder magnetic core according to this invention is characterized in that ferromagnetic powder is bound by means of binder resin made of a thermosetting resin; a compact is formed by compressing molding it in a die; and the compact is heated to be hardened, while holding it in the die in a high pressure state so as to form the compressed power magnetic core.

The viscosity of the binder resin is lowered and the detour thereof around grains of the ferromagnetic power is accelerated. In this way the production of the void portion is suppressed.

In order to achieve the third object described above, a compressed powder magnetic core according to this invention is characterized in that it is formed by compressing molding by filling a die with a mixture of ferromagnetic powder having a grain size smaller than 50 $\mu$m and binder resin after having granulated it into a granulation size between 200 $\mu$m and 500 $\mu$m.

The fluidity of the mixture is improved and the filling property into the die is increased by the fact that the molding is effected after having granulated the mixture into a granulation size between 200 $\mu$m and 500 $\mu$m at the fabrication of the compressed powder magnetic core by using ferromagnetic powder having a grain size smaller than 50 $\mu$m.

In order to achieve the fourth object described above a compressed powder magnetic core according to this invention, which is formed by binding magnetic powder made of iron or iron alloy by means of binder resin, is characterized in that it is subjected to a rust inhibiting treatment by applying rust inhibitor to either one or both of the magnetic powder and the compact or by impregnating them therewith.

Further this invention is characterized in that the rust inhibitor is either one of
  acrylic resin,
  benzotriazole and its derivatives,
  sorbitan monooleate and its derivatives,
  sodium oleate, and
  ethylamine and its derivatives.

Corrosion of the magnetic powder and the production of rust are prevented by the fact that the compressed powder magnetic core is subjected to a rust inhibiting treatment by applying rust inhibitor to either one or both of the magnetic powder and the compact or by impregnating them therewith.

BRIEF DESCRIPTION OF THE DRAWINGS

FIG. 1 is a scheme indicating an example of the steps for fabricating a compressed powder magnetic core according to this invention;

FIG. 2 shows the composition ratio of the pressed powder magnetic core according to this invention;

FIG. 5 is a scheme indicating another example of the steps for fabricating a compressed powder magnetic core according to this invention;

FIG. 6 is a front view of a linear motor of voice coil type used for measurements of magnetic characteristics of the compressed powder magnetic core according to this invention;

DETAILED DESCRIPTION

Figure 3:
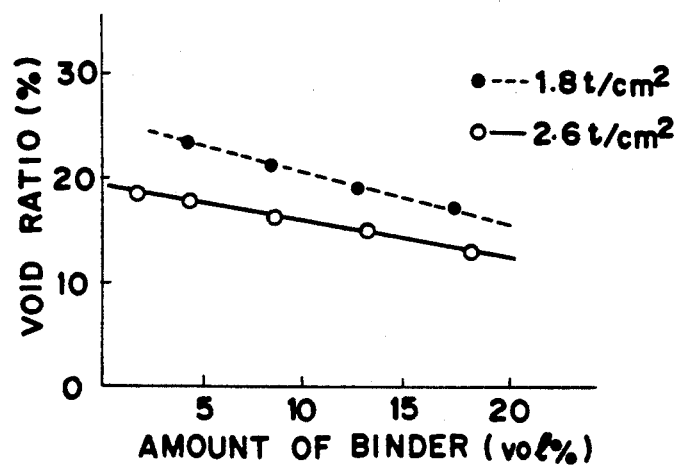
FIG. 3 is a graph representing the relation between the amount of binder resin and the void ratio when the compressing pressure is kept to be constant at the formation of the compressed powder magnetic core.

Hereinbelow this invention will be explained in detail, using a first embodiment indicated in the drawings.

According to this invention, in a compressed powder magnetic core for an inner yoke of a linear motor of voice coil type formed by binding magnetic powder by means of binder resin, the content ratio in the composition constituting a compact is defined, as indicated in FIG. 2, taking into account not only the ferromagnetic powder and the binder resin but also the void formed in the binder resin. That is, according to this invention, supposing that the composition of the compact of the compressed powder magnetic core is ferromagnetic powder a (vol %), binder resin b (vol %) and void c (vol %), where $$a+b+c=100 \text{ (vol \%)},$$

the compressed powder magnetic core is formed, taking also the void ratio c (vol %) into account.

FIG. 1 shows an example of the steps for fabricating the compressed powder magnetic core.

The figure shows an example, in which reduced iron powder, whose grain size is smaller than 500 $\mu$m, is used as the ferromagnetic powder and epoxy resin is used as binder resin, and the mixing ratio of the epoxy resin including coupling agent is 3 weight % and the residue is reduced iron powder.

Reduced iron powder and epoxy resin (including coupling agent) weighted with the predetermined mixing ratio are mixed and agitated (S2) in an agitator and thereafter a die is filed therewith. It is formed by compressing molding (S3) with a predetermined pressure (e.g. 2.6 ton/cm$^2$). After the compressing molding, the compact is subjected to natural cooling, after having been heated and hardened for one hour at a temperature of 150° C. (S4), so as to form a compressed powder magnetic core (S5).

For the compressed powder magnetic core thus fabricated, results indicated in FIG. 3 have been obtained by studying the relation among the amount of binder resin, the compacting pressure and the void ratio. As it is clearly seen from the figure, even if the amount of the binder resin (epoxy resin + coupling agent) is constant, it is clear that the void ratio varies, depending on the compacting pressure.

Concerning the magnetic property, since both the binder resin and the void are non-magnetic, it can be thought that the ratio occupied by the sum of the binder resin and the void in the compact is the ratio of the non-magnetic portion. Therefore, supposing that the sum of the amount of binder resin and the void ratio represents the ratio occupied by a non-magnetic factor, compressed powder magnetic cores were formed, while varying the ratio (vol %) occupied by the binder resin and the void ratio in this compact and their magnetic characteristics were measured. Thus the results indicated in FIG. 4 have been obtained.

Figure 4:
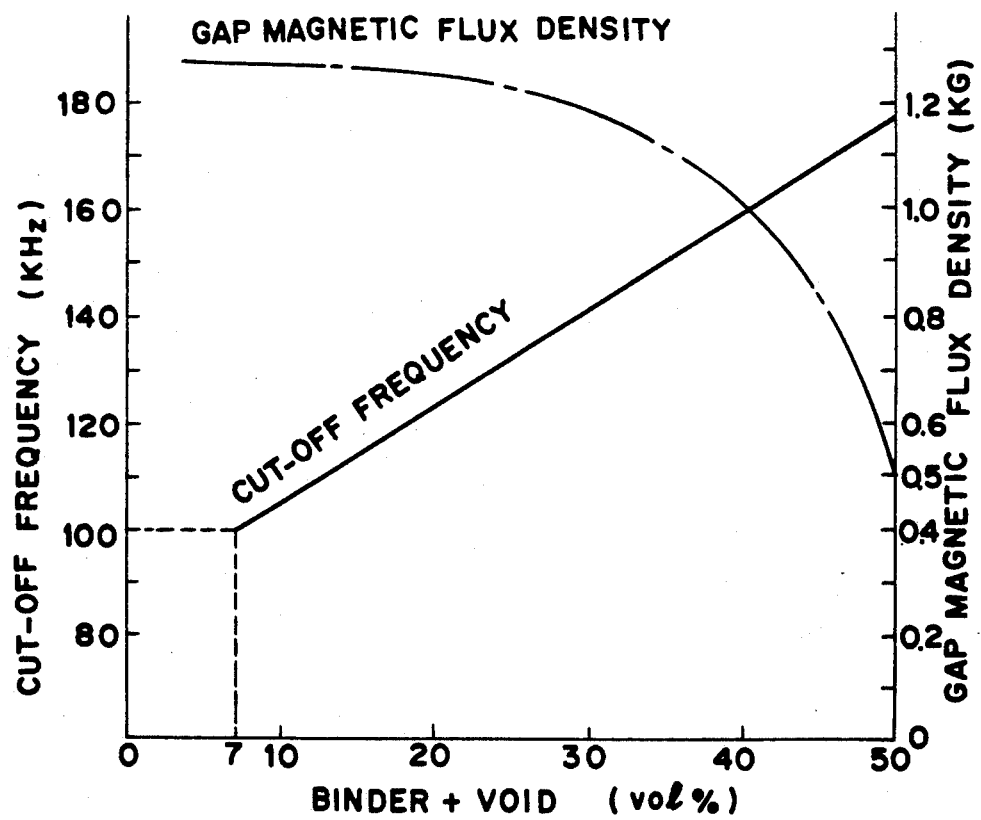
FIG. 4 is a graph representing the relation between the amount of binder resin + the void ratio and the magnetic characteristics of the compressed powder magnetic core for an inner yoke of a linear motor of void coil type according to this invention.

The magnetic characteristics indicated in FIG. 4 are represented by motor characteristics, when the compressed powder magnetic core is applied for an inner yoke in a linear motor disclosed in the Japanese patent application No. 62-245385 filed by the assignee of this application entitled "Electromagnetic Driving Device".

The linear motor used for this measurement is constructed as indicated in FIG. 6, in which reference numeral 1 is a driving coil; reference numeral 2 is an inner yoke consisting of a compressed powder magnetic core; reference numeral 3 is an outer yoke; and reference numeral 4 is a permanent magnet. The driving coil 1 is wound around the inner yoke 2 in the form of a bobbine and disposed movably in the axial direction. The two extremities of the inner yoke 2 are joined with the outer yoke 3 so as to form a closed magnetic path. The permanent magnet 4 is fixed on the inner surface of the outer yoke 3 so as to be opposite to the outer peripheral surface of the driving coil 2 and the driving coil 1 is moved along the inner yoke 2 when current flows therethrough.

At the measurement of the magnetic characteristics the magnetic gap magnetic flux density indicated in FIG. 4 shows the magnetic flux density at the magnetic gap d between the inner yoke 2 and the permanent magnet 4 illustrated in FIG. 6. As the permanent magnet 4 which had a residual magnetic flux density Br 2600 [G], a coercive force $H_c$ 2450 [$O_e$] and dimensions of L 58.5 mm $\times$ W 19 mm $\times$ t 6 mm, was used. The dimensions of the inner yoke 2 were L 75 mm $\times$ W 19 mm $\times$ t 6.4 mm and the magnetic gap d was 2.54 mm.

As transmission characteristics of the driving coil 1, the cut-off frequency $f_c$ $$fc = [(Rc+Rs) \cdot l/l]/(2\pi \mu S N^2)$$

was measured.

Figure 7:
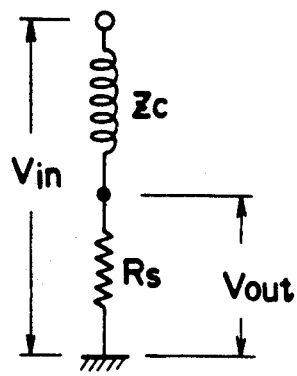
FIGS. 7A to 7E are schemes for explaining the cut-off frequency in the driving coil of a linear motor indicated in FIG. 6.
Figure 7:
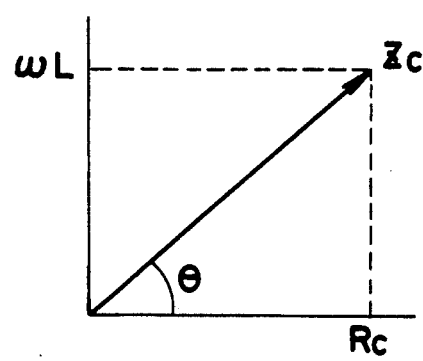

Here the cut-off frequency stated above will be briefly explained, referring to FIG. 7.

At first, the transmission characteristics of the driving coil are considered.

Denoting the DC resistance of the driving coil $R_c$ and the self inductance by L, since the impedance $Z_c$ Denoting the DC resistance of the driving coil $R_c$ and the self inductance by L, since the impedance $Z_c$ of the driving coil is represented by:

$$Zc = \sqrt{Rc^2 + (\omega L)^2} \; ; \quad (\omega = 2\pi f)$$

as indicated in FIGS. 7A and 7B, the driving voltage $V_{in}(S)$ and the output voltage $V_{out}(S)$ of the current detecting resistance $R_s$ portion are in the following relationship:

$$\frac{V_{out}(S)}{V_{in}(S)} = G(S) = \frac{Rs}{L \cdot S + Rc + Rs} \quad (1)$$

and further, using $R_c \gg R_2$, the gain is expressed by:

$$G \approx Rs/\sqrt{Rc^2 + (\omega L)^2} \; [dB] \quad (2)$$

and the cut-off frequency $f_c$ by:

$$fc = [(Rc+Rs)/2\pi L \; [Hz] \quad (3)$$

Here, if the coil were in the ideal state such as an air core coil, L and $R_c$ would be considered to be constant, and the transmission characteristics can be represented by a first order delay (rotation in phase 90°) of L indicated in Equation (1).

Figure 7C:
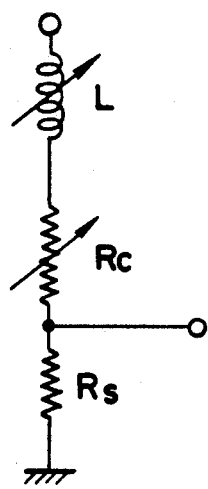
Figure 7:
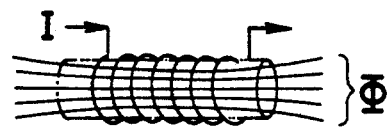
Figure 7:
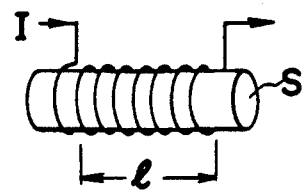

However, since there is the inner yoke 2 of the magnetic circuit at the core portion of the driving coil as the magnetic core, as indicated in FIG. 6, the real equivalent circuit is as indicated in FIG. 7C and the delay is of 0.85 order (78°) or 0.6 order (54°). That is, it is because there is the inner yoke inside of the coils as the magnetic core that the transmission characteristics of the coil are not ideal.

Therefore consider the case where there is a core having a cross-section S and a permeability $\mu$ inside of the coil, as indicated in FIG. 7E. Denoting the winding width of the coil by l; the number of turns N; and the current intensity flowing therethrough by I, the self inductance L of the coil L can be represented by:

$$L = N\Phi/I = \mu S N^2/l; \quad (\Phi = \mu HS, H = NI/l) \quad (4)$$

Here, paying attention to the cut-off frequency $f_c$ the following Equation is obtained by substituting Equation (4) for L in Equation (3):

$$fc = \{(Rc+Rs) \cdot l\}/(2\pi \mu S N^2) \quad (5)$$

That is, the cut-off frequency $f_c$ is proportional to the DC resistance of the coil + the current detecting resistance ($R_c + R_s$) and the winding width l of the coil, and inversely proportional to the permeability $\mu$ and the cross-section S of the yoke and the square of the number of turns N of the coil.

In this case, ($R_c + R_s$), l and S are determined by the specification (power supply, constitution, propulsion characteristics, etc.) and since they have a small freedom in the design, they can be considered to be fixed. Further the number of turns is considered to be fixed. Consequently the cut-off frequency $f_c$ is determined by the design of the permeability $\mu$ of the yoke. When $\mu$ decreases, the cut-off frequency $f_c$ increases and the S/N ratio is improved.

As explained above, the cut-off frequency $f_c$ varies, depending on the permeability $\mu$ of the yoke (magnetic core). Therefore the measurement of the cut-off frequency $f_c$ is substituted for the magnetic characteristics of the yoke.

For the measurement of the cut-off frequency $f_c$, the number of turns N of the driving coil was 640; winding width l=0.022 m; $R_c + R_s = 33.6 \; \Omega$ ($R_c$... DC resistance of the coil; $R_s$... current detecting resistance); and $S = 0.0064 \times 0.019 = 1.2 \times 10^{-4}$ m (cross-section of the inner yoke).

In the case where the inner yoke of the linear motor constructed as indicated in FIG. 6 is constituted by a compressed powder magnetic core, as described previously, the relationship among the sum of the binder resin and the void in the compressed powder magnetic core 2, the cut-off frequency and the magnetic gap magnetic flux density is as indicated in FIG. 4.

As it is clearly seen from FIG. 4, the gap magnetic flux density decreases rapidly with increasing sum of the binder resin and the void in the compressed powder magnetic core (inner yoke), starting from the point where the ratio thereof is about 30 vol %. When the ratio exceeds 50 vol %, the gap magnetic flux density is reduced to a value below 0.5 kG, i.e. below a half and therefore the compressed powder magnetic core cannot be used in practice. Consequently, in order that the compressed powder magnetic core (inner yoke) can play the role to be the magnetic core for the motor, the ratio of the sum of the binder resin and the void should be smaller than 50%.

Next, consider the cut-off frequency. When the ratio of the sum of the binder resin and the void in the compressed powder magnetic core (inner yoke) is below 7 vol %, the frequency characteristics are worsened and thus the compressed powder magnetic core cannot be used in practice.

Consequently, according to this invention, the compressed powder magnetic core is so formed that the sum of the binder resin volume ratio representing the volume occupied by the binder resin in the compact of the compressed powder magnetic core and the void volume ratio representing the volume occupied by the void in the binder resin is greater than 7 vol % and smaller than 50 vol %.

Iron, iron alloy, ferrite, etc. are used as the ferromagnetic powder used in the compressed powder according to this invention. Further ferromagnetic powder having a grain size smaller than 500 μm is used. This is because eddy current is easily produced and the frequency characteristics are worsened when the grain size is above 500 μm. Further it is also because when it is used as a magnetic ore for a motor, if the worst happens and some magnetic grains fall away, and if their size is great, they enter the movable part of the apparatus, which may causes locking thereof.

In the above, it was defined that the sum of the binder resin volume ratio representing the volume occupied by the binder resin in the compact of the compressed powder magnetic core and the void volume ratio representing the volume occupied by the void in the binder resin is greater than 7 vol % and smaller than 50 vol %. In addition, since isolation between magnetic grains is reduced and the frequency characteristics are worsened, if the amount of the binder resin is smaller than 2 vol %, the amount of the binder resin should be greater than 2 vol %. Further, although the compressed powder magnetic core can be used for an amount of binder resin of 30 vol %, it is desirable to define that it is below 30%, in order to suppress decrease in the gap magnetic flux density.

Furthermore, if the ratio of the volume occupied by the void in the compact is above 30 vol %, the compact is short in the strength. Therefore it should be smaller than 30 vol %.

By the forming method according to the usual compressing molding (hot isotropic press (HIP) and cold isotropic press (CIP) it is not possible to fabricate any products having the void ratio below 5%.

Consequently, in the compressed powder magnetic core according to this invention, it is defined that the ratio of the volume occupied by the binder resin in the compact should be in a region comprised between 2 and 30 vol %, that the ratio of the volume occupied by the void in the compact should be in a region comprised between 5 and 30 vol %, and that the sum of the binder resin ratio representing the volume occupied by the binder resin in the compact and the void volume ratio representing the volume occupied by the void formed in the binder resin is greater than 7% and smaller than 50%.

In this way, according to this invention, since the ratio of the non-magnetic elements (binder resin and void) to the magnetic element (ferromagnetic powder) constituting the compact of the compressed powder magnetic core is clearly defined, it is possible to fabricate with intention compressed powder magnetic cores having magnetic characteristics aimed for use as an inner yoke of a linear motor of voice coil type.

Further it is possible to set freely the magnetic characteristics by selecting a suitable combination of the binder resin and the void ratio which are non-magnetic elements.

In the compressed powder magnetic core according to this invention, in the case where the void ratio in the compact is on the upper limit (30 vol %) side, a problem that the robustness of the compact is reduced takes place.

Therefore, according to this invention, the compact after the compressing molding is subjected to a resin impregnation treatment so that voids formed in the binder resin therein are filled with resin in order to increase the robustness of the compact in a compressed powder core.

Here, as the resin for the impregnation described above, e.g. liquid epoxy resin is used which resin is prepared as follows.

| | |
|---|---|
| epoxy resin (EPIKOTE 828) | 100 phr |
| hardening agent (EPICURE T) | 20 phr |
| diluting agent (solvent such as acetone, toluene, etc.) | | suitable amount are mixed.

FIG. 5 indicates an example of the steps for the resin impregnation into the compact described above. The figure shows an example, in which epoxy resin is used as the binder resin and reduced iron powder having a grain size of 500 μm is used as the ferromagnetic powder. The mixing ratio was epoxy resin (including coupling agent) 3 weight % to reduced iron powder 97 weight %.

In FIG. 5, reduced iron powder and epoxy resin (including coupling agent) weighted with a predetermined mixing ratio are agitated and mixed for about 1 hour in an agitator (S2). After the mixing a die is filled with them and they are formed by compressing molding with a predetermined compacting pressure (e.g. 2 ton/cm$^2$) (S3). After the compressing molding, the compact is degassed under a vacuum, whose pressure is $5 \times 10^{-2}$ torr, in a vacuum chamber. Thereafter, the compact is immersed for 10 minutes in an epoxy resin solution having a viscosity of 8000 cps (centipoise), filling the vacuum chamber so that voids in the compact is filled with epoxy resin (S4). The compact after the impregnation with epoxy resin is taken out from the vacuum chamber. Subsequently it is subjected to a heat treatment for about 1 hour at a temperature of 150° C. so as to be hardened (S5). The compressed powder magnetic core is thus formed (S6).

Figure 8:
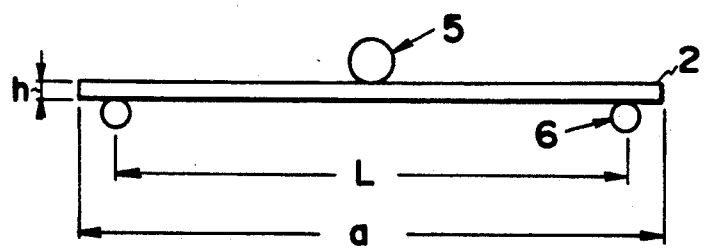
FIG. 8 illustrates a deflection strength test of the compressed powder magnetic core.

The intensity of a compressed powder magnetic core formed in this way according to this invention, that of a compressed powder magnetic core formed by immersing it in an epoxy resin solution for 30 minutes under the room temperature and the atmospheric pressure, and that of a compressed powder magnetic core, which is not subjected to any impregnation treatment, were measured by using the deflection testing method (three-point deflection test) indicated in FIG. 8 and the following results were obtained;

| | |
|---|---|
| product treated by vacuum impregnation | deflection strength 6.3 kg/mm$^2$ |
| product not treated | deflection strength 3.0 kg/mm$^2$ |
| product treated by impregnation | deflection strength 5.1 kg/mm$^2$ |

In FIG. 8, a compressed powder magnetic core of total length a=75 mm, width b=19 mm and thick h=6.5 mm was used as the test piece 2. The diameter of fulcra 6 was 5 mm and the distance between the fulcra 6 L=54 mm.

As clearly seen from the results of the test described above, the deflection strength σ was the highest for the product treated by vacuum impregnation and a strength, which was almost equal to JIS K 7203 plastic, was obtained.

As described above, in the compressed powder magnetic core according to this invention, since the compact after the compressing molding is subjected to the vacuum impregnation treatment, the void in the compact is reduced and the strength of the compact is increased. By the vacuum impregnation treatment about 90% of the whole void in the compact is filled with the impregnation resin. On the other hand, in the compressed powder magnetic resin, which is subjected only to immersion treatment, since only about 30% of the whole void is filled with resin, as indicated by the result described above, the deflection strength is lower than that of the product subjected to the vacuum impregnation treatment.

As the impregnation resin used for the vacuum impregnation into the compact, apart from the epoxy resin described above, thermosetting resins such as acrylic resin, phenolic resin, etc. can be used.

As explained above, by the compressed powder magnetic core according to this invention, it is possible to join strongly the impregnation resin with the binder resin by the vacuum impregnation using resin to fill the voids in the compact therewith and to increase remarkably deflection strength of the compressed powder magnetic core.

Further, since the compressed powder magnetic core according to this invention is subjected to resin impregnation, in the case where it is used as a winding core in a motor, the insulation thereof with respect to the winding is kept well and it is possible to omit insulator, insulating painting, etc.

In addition, the compressed powder magnetic core according to this invention can be used in various electric apparatuses as a base plate in a core slotless motor (it may be possible to form a circuit thereon), a core of a rotary transformer (high permeability material is deposited by evaporation on its extremity) applications as vibration suppressing material or magnetic shielding material (chassis for a CD player, etc.), a pole piece in a speaker, etc., apart from the core in the motor described above.

EMBODIMENT 2

This invention will be explained in detail using a second embodiment indicated in the drawings.

Figure 9:
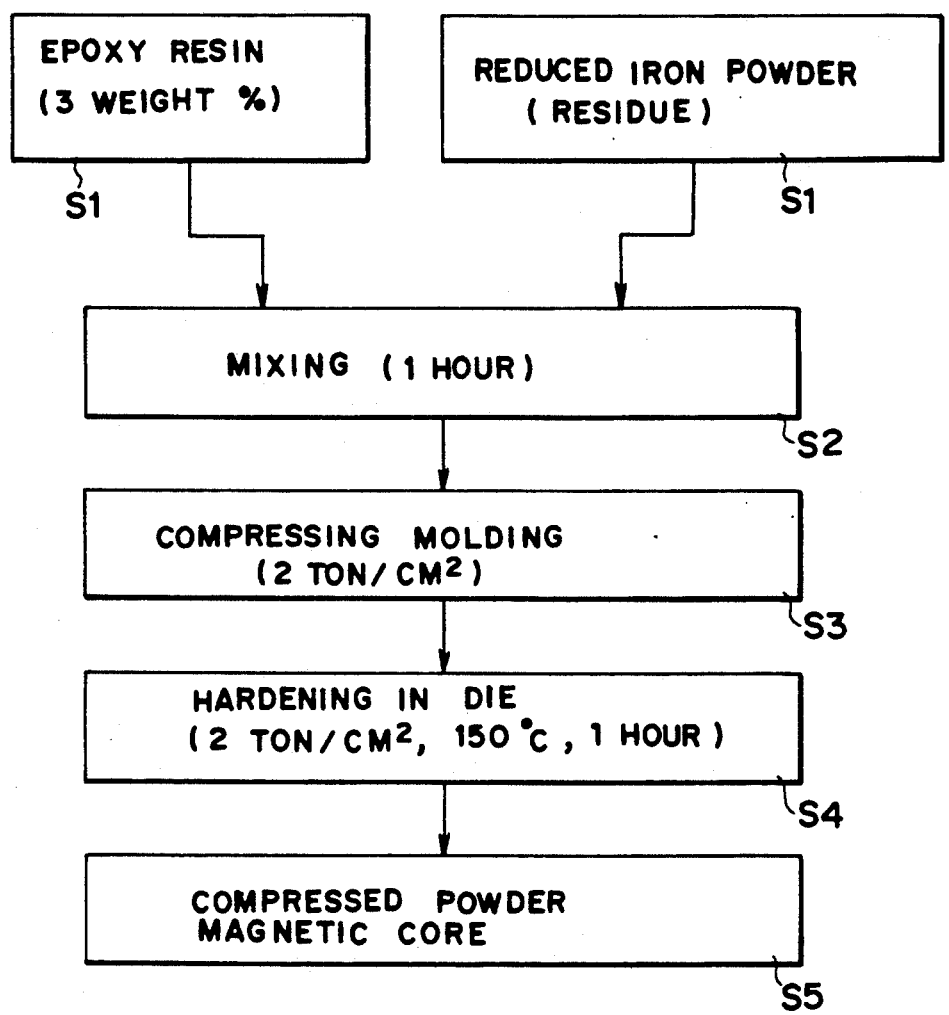
FIG. 9 is a scheme indicating an embodiment of the steps for fabricating a compressed powder magnetic core according to this invention.

FIG. 9 shows the steps for fabricating a compressed powder magnetic core which is an embodiment of this invention. In this example, reduced iron powder is used as the ferromagnetic powder and epoxy resin is used as the binder resin, and the mixing ratio of the epoxy resin is 3 weight %, the residue being reduced iron powder.

Hereinbelow a method for fabricating the compressed powder magnetic core will be explained, referring to FIG. 9.

In the figure, at first, reduced iron powder and epoxy resin weighted with respective mixing ratios are mixed and agitated (S2) for about 1 hour by means of an agitator.

Then, the compact is formed by compressing molding (S3) with a compacting pressure of 2 ton/cm², after having poured the mixture of reduced iron powder and epoxy resin to fill a die therewith.

After the compressing molding, the compact is subjected to heating hardening for 1 hour at a temperature about 150° C. as it is in the state, where it is pressed (2 ton/cm²) in the die (S4).

After the heating and hardening, the compact is taken out from the die, and cooled to form a compressed powder magnetic core (S5).

The compressed powder magnetic core fabricated as described above and the compressed powder magnetic core heated and hardened for 1 hour at a temperature 200° C., taken out from the die after the compressing molding in the die, were compared in the strength and the magnetic characteristics and the following results were obtained;

| deflection strength | heating and hardening within the die | 5.6 kg/mm² |
|---|---|---|
| | heating and hardening outside of the die | 3.0 kg/mm² |
| gap magnetic flux density | heating and hardening within the die | 960 Gauss |
| | heating and hardening outside of the die | 890 Gauss |

Figure 11:
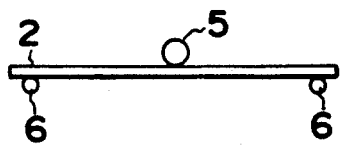
FIG. 11 is a scheme for explaining the 3 point deflection testing method indicating an example of the strength testing method for the compressed powder magnetic core.

The measurement described above of the deflection strength (deflection breaking strength) was effected by the well known three-point deflection testing method, as indicated in FIG. 11, in which reference numeral 2 is a test piece of the compressed powder magnetic core; reference numeral 6 represents fulcra; and reference numeral 5 is a load. As the test piece 2 of the compressed powder magnetic core, products heated and hardened outside of the die and those heated and hardened within the die having a same shape and same dimensions were used.

Figure 10:
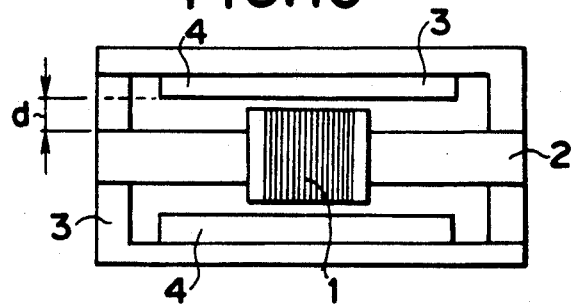
FIG. 10 is a scheme illustrating the construction of a linear motor of voice coil type used for measuring magnetic characteristics of the compressed powder magnetic core.

For the measurement of the gap magnetic flux density, measured values obtained by using compressed powder magnetic cores serving as the inner yoke in a linear motor disclosed in the Japanese patent application, No. 62-245385 filed by the assignee of this application entitled "Electromagnetic Driving Device" are shown. This linear motor is constructed as indicated in FIG. 10, and in this measurement of the magnetic flux density described above the magnetic flux density at the magnetic gap d between the inner yoke 2 consisting of a compressed powder magnetic core and the permanent magnet 4 secured to the outer yoke 3 was measured.

As it is clearly seen from the result of the measurement described above of the deflection strength and the gap magnetic flux density, it can be understood that the compressed powder magnetic core formed by heating and hardening while keeping it the compressed state within the die is more excellent in the strength and the magnetic characteristics.

This is because the viscosity of the binder resin is lowered and the detour there of around grains of the ferromagnetic powder is accelerated by the compressing molding while heating the mixture of the ferromagnetic powder and the binder resin within the die.

Consequently, by the method for fabricating the compressed powder magnetic core according to this invention, the detour of the binder resin around grains of the ferromagnetic powder is accelerated and generation of the void is suppressed by forming the compressed powder magnetic core by heating and hardening while keeping the compressed state of the compact within the die after having found ferromagnetic powder by using the binder resin consisting of thermosetting resin and formed the compact by compressing and molding within the die.

For this reason, by the fabrication method according to this invention, since the detour of the binder resin around grains of the ferromagnetic powder is accelerated, electric isolation between grains of the ferromagnetic powder is increased and generation of eddy current is prevented so that the magnetic characteristics such as the saturation magnetic flux density, etc. are improved. Further, since the void ratio is lowered by the detour of the binder resin around grains of the ferromagnetic powder, the density of the compact is increased and the mechanical strength such as the deflection strength, etc. is raised.

Further, in the case of the heating and hardening within the die, since the compact is subjected to compressing pressure at heating, interval heat productions takes place in the compact. Therefore, even at a heating temperature of 150° C., it is possible to obtain a hardening condition, which is approximately identical to that obtained by heating it at a temperature of 200° C. in the case of the heating and hardening outside of the die and thus energy saving at the fabrication may be expected.

In addition, although in FIG. 9 an example, in which epoxy resin is used as the binder resin, was shown, e.g. F-219, product of SOMAR Co. Ltd., etc. may be used as this epoxy resin. Further, apart from epoxy resin, phenolic resin, polyester resin, diallyl phtalate resin, etc. may be usable as the thermosetting resin.

The heating and hardening condition for each of the binder resin is as follows;

| phenolic resin; | 170° C., 20 minutes |
|---|---|
| polyester resin; | 180° C., 20 minutes |
| diallyl phtalate resin; | 170° C., 20 minutes |

The method for fabricating the compressed powder magnetic core according to this invention is characterized in that ferromagnetic powder is bound by using the binder resin consisting of a thermosetting resin and compressed and molded within a die so as to form a compact and a compressed powder magnetic core is formed by heating and hardening while keeping the compressed state of the compact within the die. However, in the case where the compact is completely hardened by heating it while keeping the compressed state of the compact within the die, there may remain strain due to the compression in the compressed powder magnetic core.

Therefore, according to this invention, in order to remove the strain due to the compression, as an improved embodiment of the fabrication method indicated as an example in FIG. 9, the duration of the compressing, heating and hardening within the die indicated by (S4) in the figure is shortened and the compact is further heated and hardened in a thermostatic oven after having effected the compressing, heating and hardening of short duration and taken-out it from the die.

In this way, the strain within the compressed powder magnetic core is removed and at the same time hardening is advanced by heating and hardening the compact outside of the die after the compressing, heating and hardening within the die.

EMBODIMENT 3

This invention will be explained in detail using a third embodiment indicated in the drawings.

Figure 12:
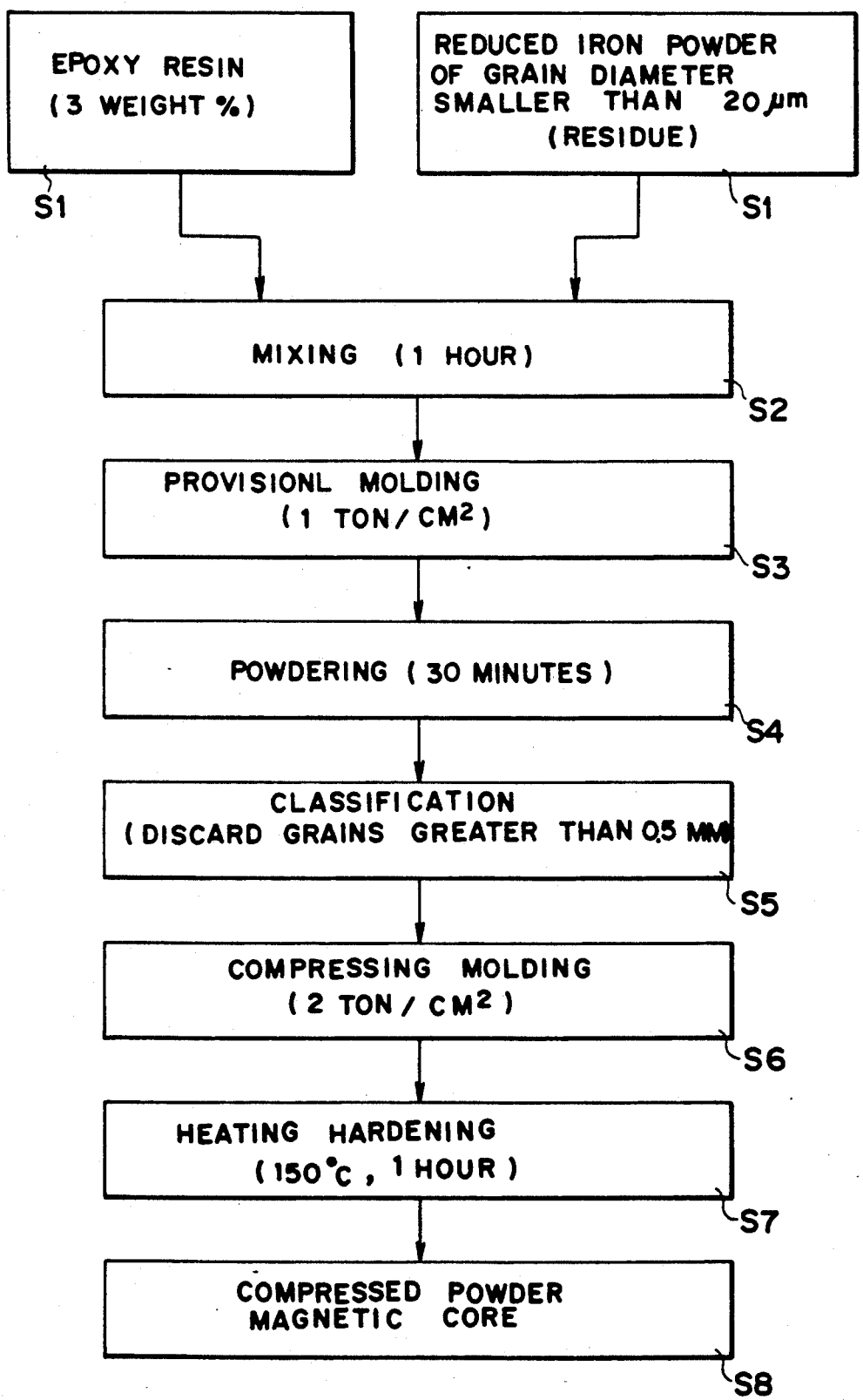
FIG. 12 is a scheme indicating another example of the steps for fabricating a compressed powder magnetic core according to this invention.

FIG. 12 shows an example of the steps for fabricating a compressed powder magnetic core which is an embodiment of this invention. In this example, reduced iron powder is used as the ferromagnetic powder and epoxy resin is used as the binder resin, and the mixing ratio of the epoxy resin is 3 weight %, the residue being reduced iron powder.

Hereinbelow a method for fabricating the compressed powder magnetic core will be explained referring to FIG. 12.

In the figure, at first, reduced iron powder and epoxy resin weighted with respective mixing ratios are mixed and agitated (S2) for about 1 hour by means of an agitator.

Then a compound as indicated in FIG. 14(I) is provisionally formed into a block shape by compressing molding (S3) with a compacting pressure of 1 ton/cm$^2$, after having poured the mixture (compound) of reduced iron powder and epoxy resin to fill a die for provisional molding therewith.

Figure 14:
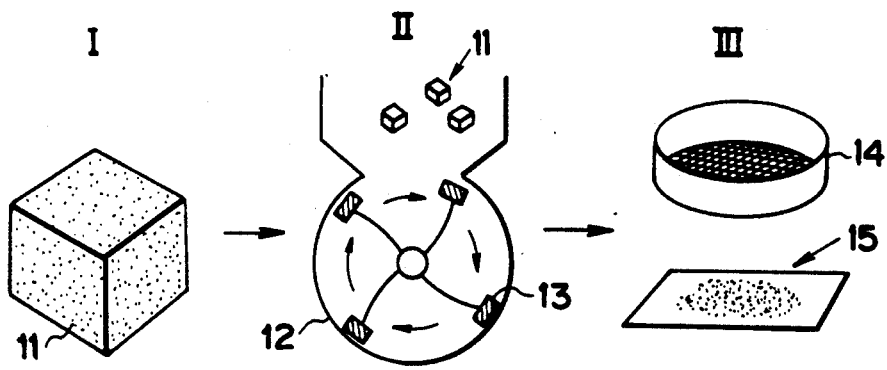
FIG. 14 is a scheme for explaining a granulation method indicating an example of the granulation method.

The compound 11 provisionally formed into a block shape is subjected to a pulverizing treatment for about 30 minutes by means of a hammer mill 12 or a stamp mill, etc. as indicated in FIG. 14(II) so as to granulate powder-shaped compound (S4).

The granulated compound pulverized into a powder shape is sieved (classified) by means of a classifying net 14, etc., as indicated in FIG. 14(III) and compound powder having a grain size greater than 0.5 mm (500 μm) is removed so that only compound powder 15 having a grain size smaller than 0.5 mm is selected (S5).

As the method for granulating the compound, the well-known disk-turning method, the pushing-out method, etc. may be used.

Figure 15:
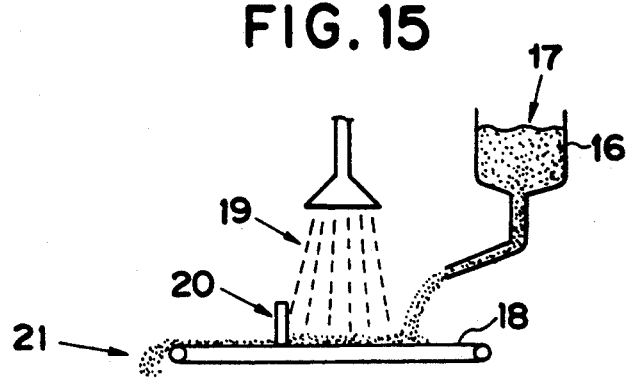
FIG. 15 is a scheme for explaining another example of the granulation method.

Further, as the method for classifying the compound powder having a grain size smaller than 0.5 mm, apart therefrom, a method using a wet granulator as indicated in FIG. 15 may be used. By the method using this wet granulator, the compound powder 17 is made flow by using a water shower 19 while spreading it on a table 18, etc. and the compound powder 21 having a grain size smaller than 0.5 mm is classified by making it pass through a selector 20 such as a strainer.

Next, after the compound powder having a grain size smaller than 0.5 mm selected by the classifying step has been poured in a die, a compact is formed by compressing molding (S6) with a compacting pressure of about 2 ton/cm$^2$. The compact thus formed is subjected to a heating treatment for about 1 hour at a temperature of about 150° C. in a thermostatic oven, etc. so as to be hardened (S7). The compact after the heating and hardening is left to be cooled so as to form the compressed powder magnetic core (S8).

The density of the compact was measured for compressed powder magnetic cores according to this invention formed through the granulation step as described above and prior art compressed powder magnetic cores formed not through the granulation step and the following results were obtained;

| density of compact | compact after granulation: | 5.75 g/cm$^2$ |
|---|---|---|
| | compact not granulated: | 5.75 g/cm$^2$ |

As it is clearly seen from the measurement results described above, a result that the compressed powder magnetic core according to this invention, which is formed by provisionally forming it after having mixed the ferromagnetic powder and the binder resin and compressing molding it after having pulverized the provisionally formed compound to granulate it, has a higher density of the compact, was obtained.

When it was tried to obtain a density equal to that of the compact after the granulation without passing through the granulation step, a compacting pressure of 3 ton/cm² was required (a compacting pressure of 2 ton/cm² was sufficient for compacts formed through the granulation step).

This is because, in the case where ferromagnetic powder having a small grain size is used as the magnetic material, the fluidity of the compound of this ferromagnetic powder and the binder resin is bad, and for this reason in the case where the compound is poured directly in a die so as to fill it herewith as by the prior art techniques, filling of the die is insufficient; the filling density is decreased; and voids are apt to be produced.

For this reason, in the case where the compressed powder magnetic core is fabricated not through the granulation step, the filling density in the die is insufficient and therefore in the case where the compacting pressure is low, it is not possible to increase the density of the compact. Consequently, in order to increase the density of the compact the compacting pressure at the compressing molding should be high.

On the contrary, according to this invention, since the die is filled with powder after having granulated the compound stated above so as to have a grain size having a good fluidity, the degree of filling is raised so that the filling density is remarkably increased and thus production of voids is suppressed. In this way it is possible to increase the density of the compact, even if the pressure at the compressing and molding is low.

Therefore, the compressed powder magnetic core according to this invention can have more easily a high density of the compact than that fabricated by the prior art techniques, and thus it is possible to increase the mechanical strength. Further, since the density of the compact is high, the magnetic characteristics may be improved such as the saturation magnetic flux density is increased, etc.

The granulation size of the compound of the ferromagnetic powder and the binder resin, which is in a region comprised between 0.2 mm and 0.5 mm, is most suitable. The effect is reduced both for the granulation size greater than it and for that smaller than it.

Figure 13:
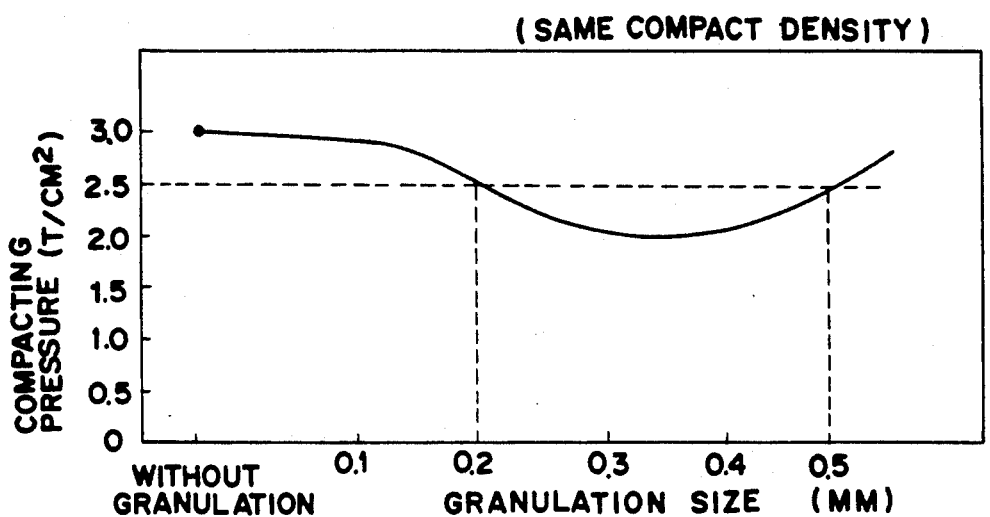
FIG. 13 is a graph representing the relation between the granulation size of compound and the compacting pressure, which is necessary for obtaining compacts having a same density.

This is because, as it can be seen from the graph indicated in FIG. 13, representing the relationship between the granulation size and the compacting pressure (compacting pressure for obtaining compacts having a same density), the compacting pressure would be too high, if the granulation size of the compound were smaller than 0.2 mm or greater than 0.5 mm.

That is, if the granulation size of the compound were smaller than 0.2 mm, the fluidity of the powder would be low and the degree of filling would be bad just as in the case where the compressing molding is effected without granulating the compound so that the compacting pressure would be increased. On the contrary, if the granulation size of the compound were greater than 0.5 mm, although the fluidity would be high, voids would be apt to be produced between granulation grains. In order to remove these voids, it is necessary to modify the shape of the granulation grains at the compressing molding and a pressure, which is sufficient for modifying the shape, is required.

Consequently, in order to keep the compacting pressure at the compressing molding to a small value and to obtain a satisfactory compact density, the granulation size of the compound is defined to be in a region comprised between 0.2 mm and 0.5 mm.

By defining it as described above, it is possible to lower the compacting pressure at the compressing molding.

In the case where the compacting pressure at the compressing molding is lowered, wear of the die is reduced and it becomes possible to fabricate a number of compacts with one die, which increases the productivity.

EMBODIMENT 4

This invention will be explained in detail using a fourth embodiment indicated in the drawings.

Figure 16:
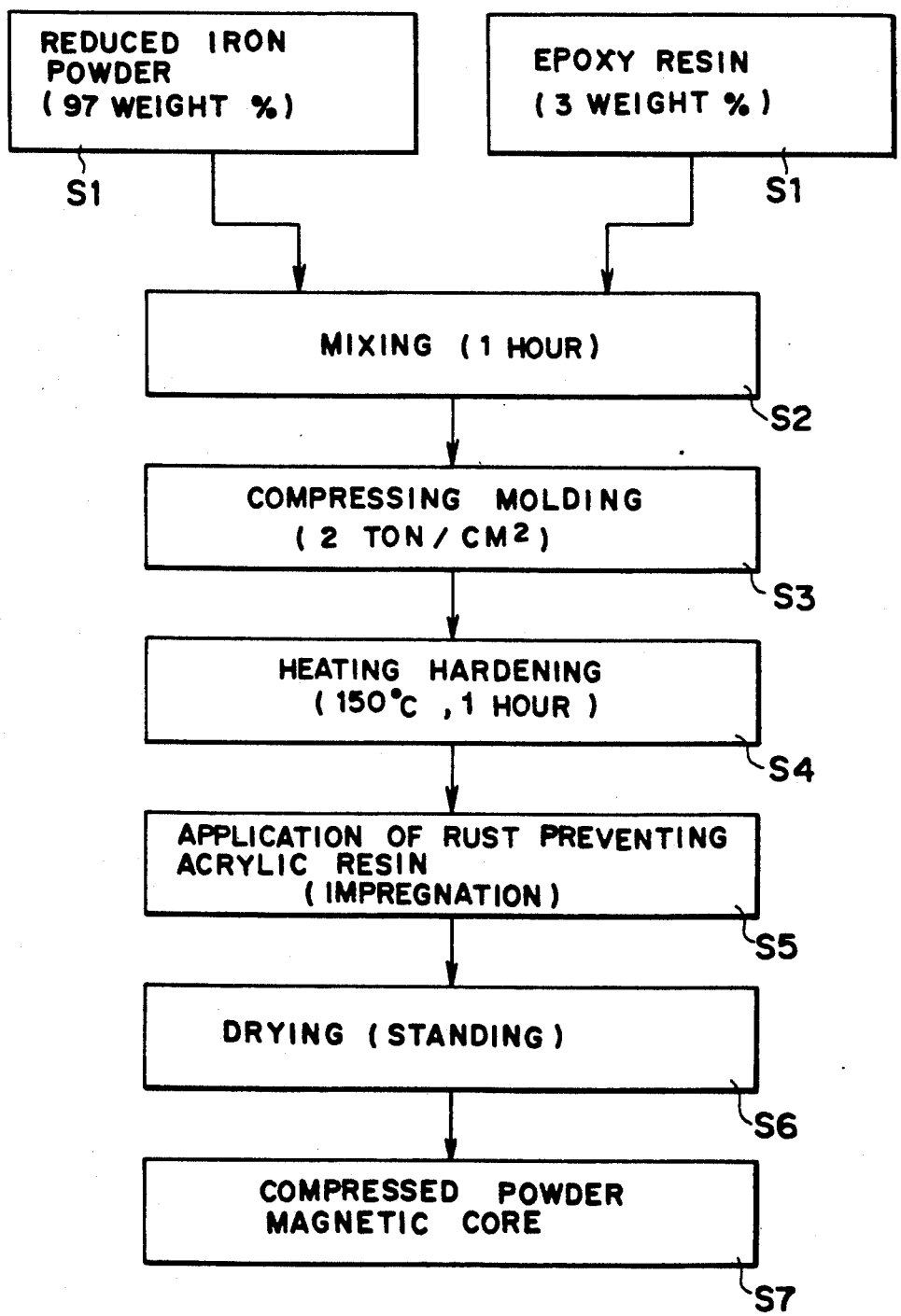
FIG. 16 is a scheme indicating still another example of the steps for fabricating a compressed powder magnetic core according to this invention.

FIG. 16 shows an example of the steps for fabricating a compressed powder magnetic core according to this invention. FIG. 16 shows an example, where the compressed powder magnetic core is subjected to a rust inhibiting treatment after the compressing molding of the compressed powder magnetic core, for which reduced iron powder is used as the magnetic powder; epoxy resin is used as the binder resin; and the mixing ratio of the epoxy resin is 3 weight %, while that of the reduced iron powder is 97 weight %.

In the figure, at first, reduced iron powder and epoxy resin weighted with respective mixing ratios are mixed and agitated (S2) for 1 hour by means of an agitator. Then they are poured in a die and formed by compressing molding with a compacting pressure of 2 ton/cm² (S3). The compact formed by compressing molding is subjected to a heating treatment for about 1 hour at a temperature of 150° C. so as to be hardened (S4). Thereafter rust inhibitor, e.g. acrylic rust inhibiting resin is applied on the compact after the heating hardening or it is impregnated therewith in order to subject the compact to a rust inhibiting treatment (S5). Finally the compact after the rust inhibiting treatment is dried (S6) to complete the compressed powder magnetic core.

Now the rust inhibiting treatment stated above after the formation of the compact of the compressed powder magnetic core will be explained in detail, using an example.

Figure 19:
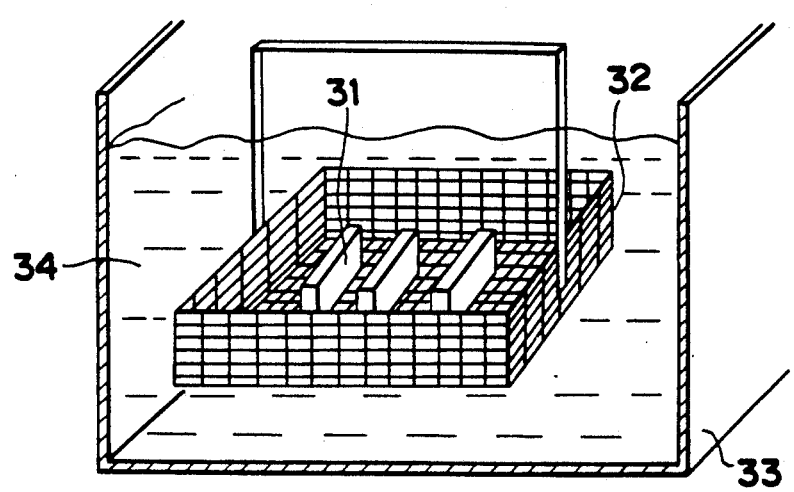
FIG. 19 is a scheme for explaining a rust inhibiting treatment method by impregnation used at applying rust inhibitor to the compact or impregnating it therewith.

1. Example of the treatment in the case where acrylic rust inhibiting resin, e.g. acrylic paint, is used as the rust inhibitor, as indicated in FIG. 16.
    (1) At first, the acrylic paint (viscosity 260 cps at 25°) is diluted with the same weight of methylethyl heton.
    (2) Next, the compact 31 after the heating and hardening is immersed in a diluted solution 34 of the acrylic paint filling an immersion tank 33 for about 30 seconds by means of a basket 32, etc. as indicated in FIG. 19 so as to apply the acrylic paint on the compact 31.
    (3) The compact after the immersion is taken-out therefrom left to stand for about 1 hour at a temperature of 60° C. so as to be dried.
    (4) The compact after the drying is again immersed in the dituted solution of acrylic paint.
    (5) The compact after the reimmersion is again dried. In order to prevent unevenness in the application of the paint, at the drying the surface, which was on the lower side at the last drying (3), is placed on the upper side.
    (6) After the drying the compact is cooled to the room temperature to complete the compressed powder magnetic core.

2. Example of the treatment in the case where sorbitan monooleate is used as the rust inhibitor.
   (1) At first, before the treatment, sorbitan monooleate diluted with the same weight of acetone.
   (2) Next, the compact 31 after the heating and hardening is immersed in a diluted solution 34 of sorbitan monooleate for about 1 minute by means of a basket 32, etc. as indicated in FIG. 19.
   (3) The compact after the immersion is taken-out therefrom; left to stand for about 1 hour at a temperature of 60° C. so as to be dried.
   (4) The compact after the drying is cooled to complete the compressed powder magnetic core.

In the above, two concrete examples of the rust inhibiting treatment after the compressing molding of the compressed powder magnetic core have been shown. However, as the rust inhibiting treatment after the compressing molding, apart therefrom, a vacuum chamber is filled with a rust inhibiting solution and the compact is immersed in the rust inhibiting solution so as to impregnate it therewith after having degassed the compact in the vacuum chamber.

By this vacuum impregnation method, in the case where the compact is impregnated with the rust inhibitor, it can penetrate into not only surface of the compact but also the inner void and thus the rust inhibiting power can be increased.

For the compressed powder magnetic core according to this invention, which is fabricated according to the fabrication steps indicated in FIG. 16, a compressed powder magnetic core immersed in rust inhibiting oil after the compressing molding, and a compressed powder magnetic core subjected to a rust inhibiting treatment, a humidity resistance test was effected under environmental conditions of temperature 60° C., humidity 90%, and standing duration 200 hours and the following result was obtained;

| product treated with acrylic resin | not rusted |
| product impregnated with | rusted on the whole surface |
| rust inhibiting oil product not treated | rusted on the whole surface |

As it is clearly seen from this result, for the compressed powder magnetic core according to this invention, which is fabricated according to the fabrication steps indicated in FIG. 16, it was verified that the compact is not rusted even under environments of high temperature and high humidity and has an excellent rust inhibiting power.

Figure 17:
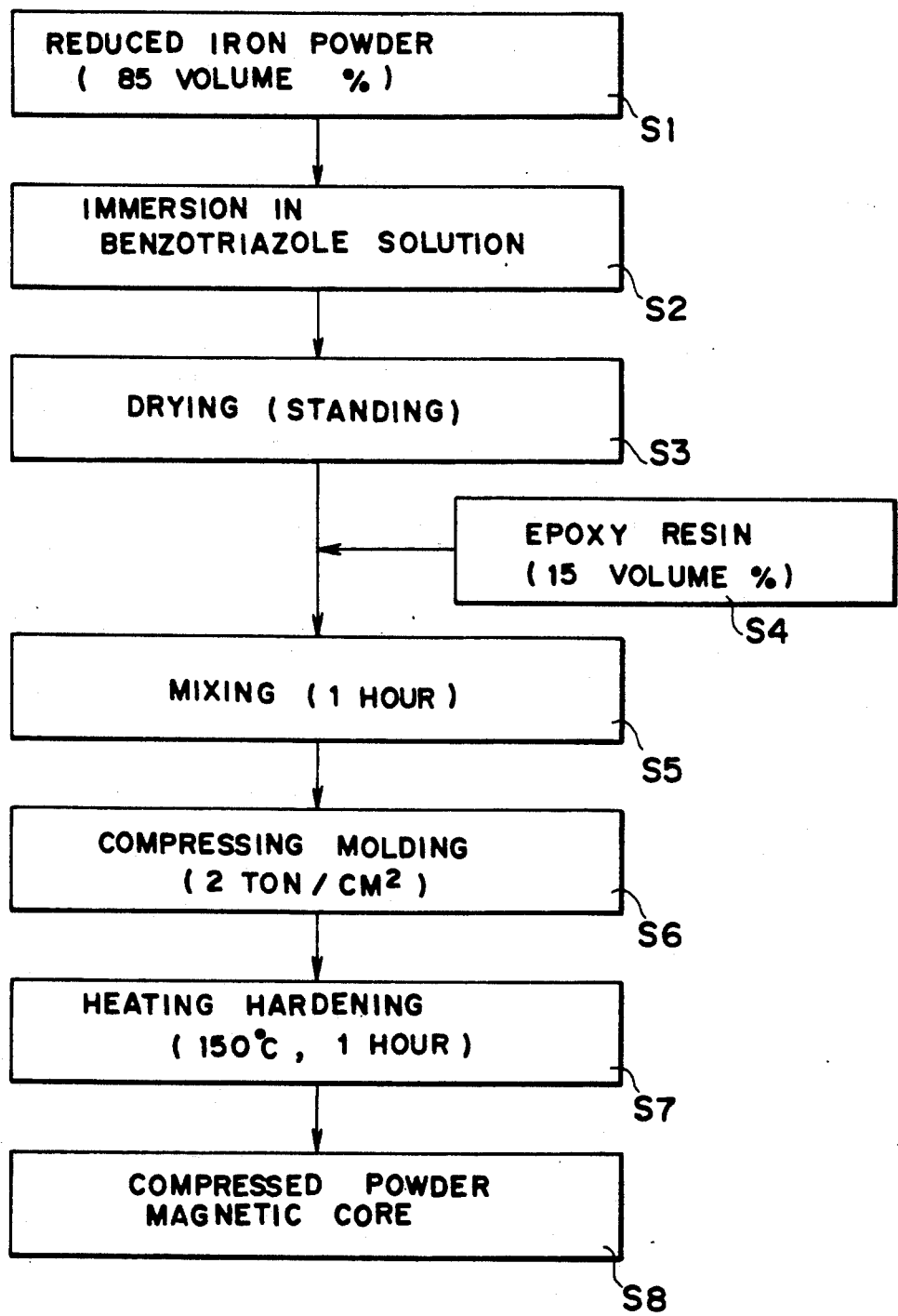
FIG. 17 is a scheme indicating still another example of the steps for fabricating a compressed powder magnetic core according to this invention.

FIG. 17 shows another example of the fabrication steps of the compressed powder magnetic core according to this invention, by which magnetic powder itself is subjected to a rust inhibiting treatment.

In this example, reduced iron powder is used as the magnetic powder; epoxy resin is used as the binder resin; and the mixing ratio of the epoxy resin is 15 vol % while that of the reduced iron powder is 85 vol %.

Figure 20:
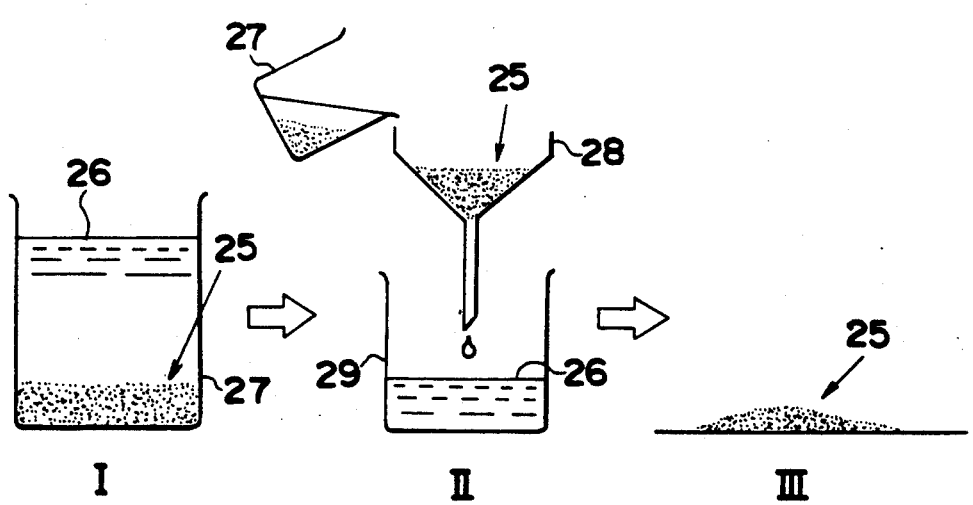
FIG. 20 is a scheme for explaining a rust inhibiting treatment method used at coating magnetic powder with rust inhibitor.

In FIG. 17, at first, reduced iron powder 25 is immersed in a rust inhibiting solution 26, e.g. benzotriazole solution, contained in a vessel 27 (S2), as indicated in FIG. 20I, after having weighted the reduced iron powder corresponding to the mixing ratio described above (S1). Then, as indicated in FIG. 20II, the reduced iron powder 25, to which the rust inhibitor 26 is applied by immersion, is taken-out by means of a funnel, etc. and dried (S3), as indicated in FIG. 20III, so that a coating film of the rust inhibitor is formed on the surface of the reduced iron powder 25. Next, the reduced iron powder, on which the coating film of the rust inhibitor is formed, and the epoxy resin weighted according to the mixing ratio described above are put in an agitator and agitated for about 1 hour. After having been mixed uniformly (S5), they are poured in a die and compressed and molded with a compacting pressure of 2 ton/cm$^2$ (S6). A compact formed by the compressing molding is subjected to a heat treatment for about 1 hour at a temperature of 150° C. to be hardened (S7). The compact after the heating and hardening is cooled to the room temperature and a compressed powder magnetic core is completed (S8).

In the above, a case where the magnetic powder itself is subjected to a rust inhibiting treatment is shown, referring to FIG. 17. In the case where the magnetic powder is subjected to the rust inhibiting treatment, even if the coating film of the rust inhibitor is peeled at a surface, where the compact is rubbed by the die at the compressing molding and rust is produced on the surface, where the coating film of the rust inhibitor is peeled, since the magnetic powder in the compact is coated by the rust inhibitor, propagation of the rust towards the interior of the compact is prevented. However, since the production of the rust on the surface has bad influences on the magnetic characteristics of the compressed powder magnetic core, it is not preferable.

Consequently, usually a method, by which the compact after the heating and hardening is subjected to a rust inhibiting treatment, as indicated in FIG. 16, is adopted.

Figure 18:
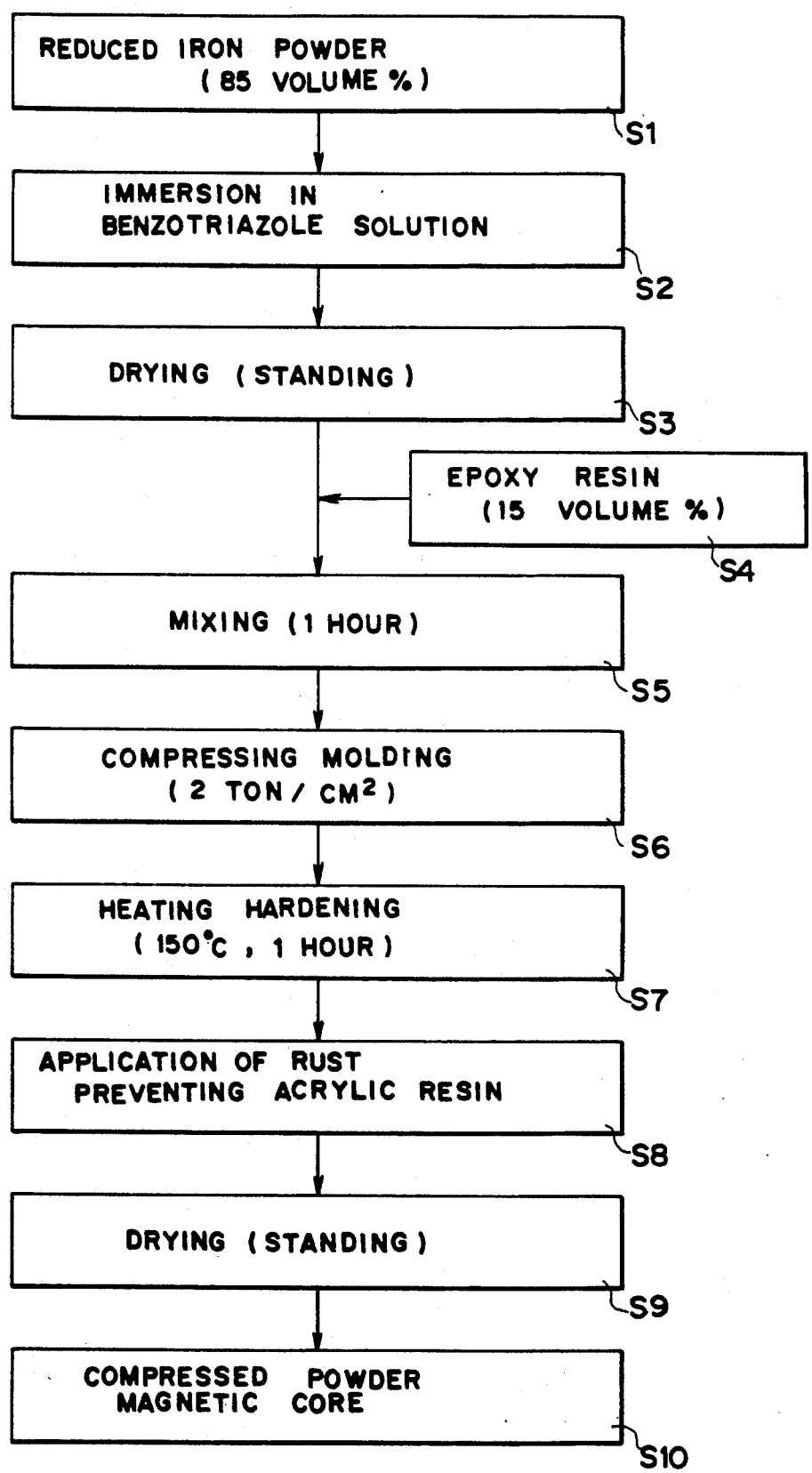
FIG. 18 is a scheme indicating still another example of the steps for fabricating a compressed powder magnetic core according to this invention.

In addition, in order to obtain a more satisfactory rust inhibiting power, as indicated by the flowchart (S1) to (S3) in FIG. 18, the magnetic powder (e.g. reduced iron powder) may be subjected to the rust inhibiting treatment. Then, after a compact has been formed according to the flowchart (S4) to (S7), the rust inhibitor may be applied further to the compact or it may be impregnated therewith to subject it to the rust inhibiting treatment (S8) to (S10) in order to obtain a compressed powder magnetic core subjected to a double rust inhibiting treatment.

For the compressed powder magnetic core thus subjected to a double rust inhibiting treatment, since not only the surface of the compressed powder magnetic core but also individual magnetic grains themselves are coated with the rust inhibitor, an effect can be obtained that the rust inhibiting power is almost not decreased, even in the case where the surface of the compressed powder magnetic core is damaged.

As explained above, referring to FIGS. 16 to 20, in the compressed powder magnetic core according to this invention, since the rust inhibitor is applied to either one or both of the magnetic powder and the compact, or either one or both of them are impregnated therewith in order to subject them to the rust inhibiting treatment, corrosion of the magnetic powder is prevented and thus it is not feared that it is rusted, even if it is placed under environmental conditions of high-temperature and high humidity.

The most suitable rust inhibitors used for the rust inhibiting treatment of the compressed powder magnetic core are, apart from acrylic resin, benzotriazole and its derivatives, sorbitan monooleate and its derivatives described previously, sodium oleate, ethylamine and its derivatives, etc.

Further, although in FIGS. 16 to 18 the example, in which the compressed powder magnetic core has been formed by using reduced iron powder as the magnetic powder, has been shown, this invention can be applied as well to the case, where ferroalloys are used as the magnetic powder.

In the case where the compressed powder magnetic core is formed e.g. by using Nd-Fe-B magnetic powder, bond magnets having an excellent rust inhibiting power can be fabricated.

What is claimed is:

1. A compressed powder magnetic core for an inner yoke of a linear voice coil motor, said core being a compressed body of a ferromagnetic powder and a hardenable binder resin wherein the sum of the body volume percentage of binder resin in said body and the body volume percentage of voids in said body after compression and hardening and before addition of any void-filling material is greater than about 7 per cent and smaller than about 50 per cent and the body volume percentage of voids in said body after compression and hardening and before addition of any void-filling material is greater than about 5 per cent and less than about 30 per cent and wherein said voids are filled with a hardened filler resin.

2. A compressed powder magnetic core according to claim 1 wherein said ferromagnetic powder is at least one member selected from the group consisting of iron, iron alloy, reduced iron and ferrite.

3. A compressed powder magnetic core according to claim 1 wherein the volume percentage of the binder resin exclusive of any void-filing materials is between about 2% and about 30%.

4. A compressed powder magnetic core according to claim 1 wherein said filler resin is at least one member selected from the group consisting of epoxy resin, acrylic resin and phenolic resin.

5. A compressed powder magnetic core according to claim 1 wherein the grain size of the ferromagnetic powder is smaller than about 500 microns.

6. A compressed powder magnetic core according to claim 1 wherein said binder resin is a thermosetting resin; said body is formed by compression molding a mixture of said powder and said binder resin in a die; and said body is heated to be hardened while holding it in said die in a high pressure state.

7. The compressed powder magnetic core of claim 6 wherein said binder resin is at least one member selected from the group consisting of epoxy resin, phenolic resin, and polyester resin.

* * * * *